Aug. 26, 1930.   A. G. OWENS   1,774,037
BATTERY FOR FLASH LIGHTS
Filed March 19, 1928   2 Sheets-Sheet 1

INVENTOR
Arthur G. Owens
By
Attorney

Aug. 26, 1930.  A. G. OWENS  1,774,037
BATTERY FOR FLASH LIGHTS
Filed March 19, 1928  2 Sheets-Sheet 2
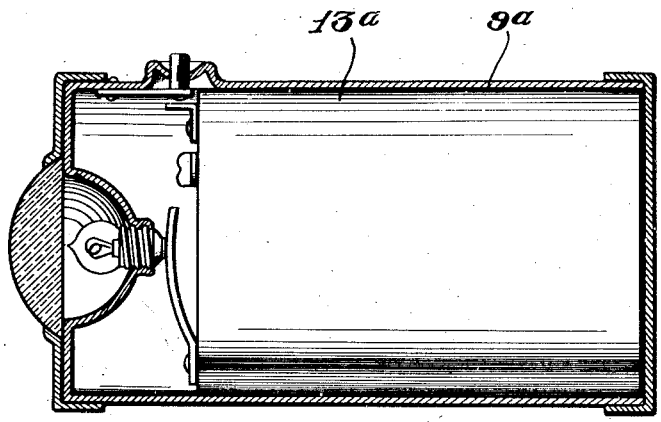
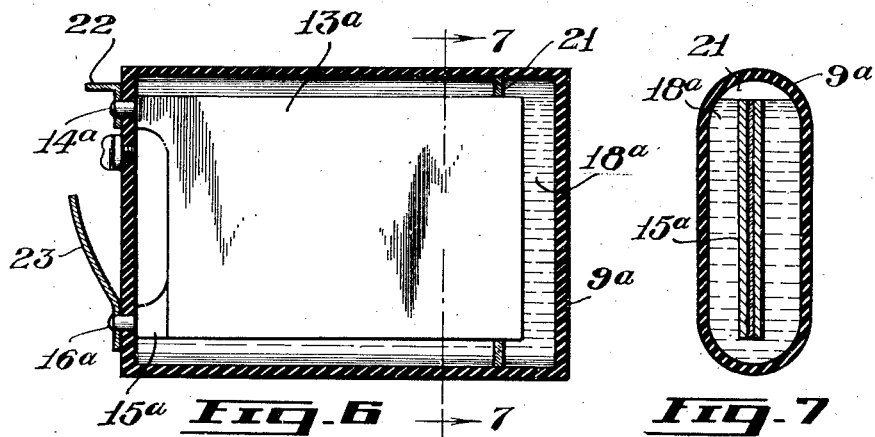
INVENTOR
Arthur G. Owens
By
Attorney Patented Aug. 26, 1930

1,774,037

UNITED STATES PATENT OFFICE

ARTHUR GRAHAM OWENS, OF GOLDEN, BRITISH COLUMBIA, CANADA, ASSIGNOR, BY DIRECT AND MESNE ASSIGNMENTS, TO THE TRUSTS AND GUARANTEE COMPANY, LIMITED, OF TORONTO, ONTARIO, CANADA

BATTERY FOR FLASH LIGHTS

Application filed March 19, 1928. Serial No. 262,863.

This invention relates to improvements in a battery for flashlights and appertains particularly to a wet cell of new and improved design and the novel form of casing of container therefor.

The principal object is to provide a wet battery adapted for use in flashlights, of substantially the same size and shape and having the contacts or terminals positioned as in the present dry batteries and consequently usable in their stead in conventional flashlights, torches and such lamps.

A further object is to provide an electric accumulator or wet battery of this kind encased in a suitable container with the plates thereof formed to utilize the available space to the best advantage.

A still further object is the provision of a battery for flashlights of the nature set forth characterized by structural simplicity, durability, efficiency and low cost of production being thereby rendered commercially desirable.

To the accomplishment of these and related objects as will become apparent as the description proceeds, my invention resides in the construction, combination and arrangement of parts as shall be hereinafter more fully described, illustrated in the accompanying drawings, and pointed out in the claim hereunto appended.

The invention will be best understood and can be more clearly described when reference is had to the drawings forming a part of this disclosure wherein like characters indicate like parts throughout the several views.

In the drawings:—

Figure 5 is a longitudinal section through another type of flashlight case with a modified form of battery shown in elevation therein;

Figure 6 is a longitudinal section of this modified form of battery;

Figure 7 is a transverse section of the same battery as taken on the line 7—7 of Figure 6; and Figure 8 is an end elevation of this modified form of battery showing the altered arrangement of the terminal contact points.

Figure 1:
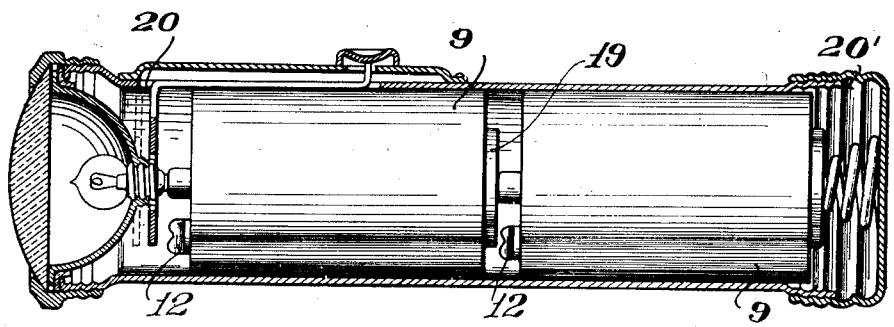
Figure 1 is a section through the casing of an ordinary type of flashlight with a pair of my batteries arranged in series and shown in elevation therein.
Figures 2, 3:
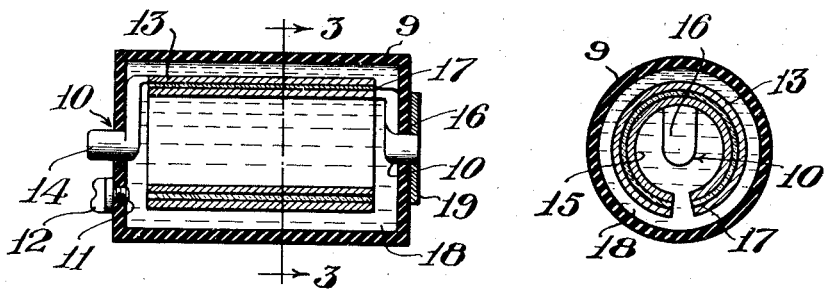
Figure 2 is a longitudinal section through one of my improved cells.
Figure 3 is a transverse section of a similar cell as taken on the line 3—3 of Figure 2.
Figure 4:
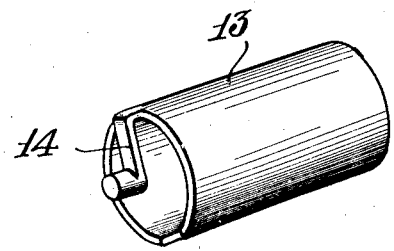
Figure 4 is a perspective elevation of one of the plates employed in my improved battery.

Heretofore it has been impossible to obtain a wet battery for portable lamps or flashlights that would prove satisfactory as certain important structural variations were necessary. This improved battery is then a decided departure from the regular development of the art being designed especially for flashlight use. It comprises a cylindrical casing 9 of celluloid or other suitable material. It is light in weight, impervious to the action of the electrolyte it is intended to contain, and slightly flexible to give in the event of pressure accumulating from any chemical reaction within. An axial opening 10 occurs in each end of the casing 9 for a purpose to be explained presently and a second eccentric and threaded opening 11 is provided in one end; in which latter and threaded opening 11 a thumb screw closure member 12 is located.

The positive electrode 13 is prepared from a flat sheet rolled into almost cylindrical form with the opposite ends of the original sheet confronting but spaced from one another. The terminal 14 continues upwardly from centrally of a side of the sheet in the form of a Z whose free offset end is circular in cross section and coaxial with the substantially cylindrical electrode 13. The negative electrode 15 is of similar configuration only of reduced diameter and likewise includes a coaxial and offset or Z-shaped terminal 16.

In assembling the parts the concentric electrodes 13 and 15 are separated by an insulating spacer 17 and nested the one within the other, with the terminals 14 and 16 projecting from opposite ends and through the respective aligned axial openings 10 in opposite ends of the casing 9. Longitudinal spacing of the assembled electrodes is cared for by the shoulders of the offset Z shaped terminals and the slits down the sides of the cylindrical-like electrodes 13 and 15 and spacer 17 are all brought into registry.

The casing 9 is filled with an electrolyte 18 through the opening 11 and comes readily into contact with the electrodes, circulating freely around the ends of the cylinders and through the split sides thereof.

The terminal 16 of the negative electrode 15, the one here shown as projecting through the end of the casing remote from that carrying the screw filling plug 12, is surrounded by an exteriorly applied annular ring 19 and finished off flush with the surface thereof. The opposite poles are thus readily distinguishable and moreover surer contact is obtained when the cells are arranged in series as is often found desirable and shown in Figure 1, in the chamber 20 of a flashlight 20'.

In Figures 5, 6, 7 and 8, the modified form of battery, adapted for use in the flat or oval flashlight torch where but one cell is employed, is shown. Here the casing $9^a$ is oval in cross section but constructed of similar material; the electrodes $13^a$ and $15^a$ are flat and lie parallel side by side separated by the spacer $17^a$, though if desired they could be as oval or flattened cylinders, in cross section; and the terminals $14^a$ and $16^a$, though both project through the same end of the casing $9^a$ are offset to bring them into alignment.

The filling plug $12^a$ screwing into the casing end and the electrolyte $18^a$ are identical with those already disclosed but an insulating support 21 holds the free ends of the electrodes $13^a$ and $15^a$ steady and spring contact members 22 and 23 are fastened to the electrode terminals $14^a$ and $16^a$ respectively for connection purposes.

In view of the explicit and detailed nature of the preceding explanation, it should suffice in conclusion to say that from the foregoing description taken in connection with the accompanying drawings, it will be manifest that a battery for flashlights is provided that will fulfil all the necessary requirements of such a device, but as many apparently widely different embodiments of my invention may be constructed within the scope of the appended claim without departing from the spirit or scope thereof, it is intended that all matters contained in the said accompanying specifications and drawings shall be interpreted as illustrative and not in a limited sense.

Having thus described my invention, what I claim as new and desire to secure by Letters Patent is:—

A battery for flashlights comprising a cylindrical celluloid casing; concentrically nested positive and negative electrodes of identical longitudinally split cylindrical form in cross section and aligned and coaxial offset Z-shaped terminals extending from said electrodes and projecting through opposite ends of said casing.

In testimony whereof I hereunto affix my signature.

ARTHUR GRAHAM OWENS. [L. S.]